United States Patent [19]
Melone

[11] 3,915,753
[45] Oct. 28, 1975

[54] LIQUID INDICATOR FOR A STORAGE BATTERY WITH A FLAME BARRIER VENT FILTER

[75] Inventor: Robert Richard Melone, Des Plaines, Ill.

[73] Assignee: Illinois Tool Works Inc., Chicago, Ill.

[22] Filed: Mar. 18, 1974

[21] Appl. No.: 452,081

[52] U.S. Cl. .................. 136/177; 136/182; 73/291; 73/327
[51] Int. Cl.² ........................................ H01M 1/06
[58] Field of Search ...... 136/177, 182; 73/323, 325, 73/327, 334, 291

[56] References Cited
UNITED STATES PATENTS

| | | | |
|---|---|---|---|
| 3,033,911 | 5/1962 | Duddy | 136/177 |
| 3,319,597 | 5/1967 | Schnitzius et al. | 73/327 |
| 3,383,917 | 5/1968 | Ryder et al. | 73/327 |
| 3,490,954 | 1/1970 | Babusci et al. | 136/177 |
| 3,507,708 | 4/1970 | Vignaud | 136/177 |
| 3,597,973 | 8/1971 | Ryder | 73/291 |
| 3,708,347 | 1/1973 | Blaich et al. | 136/182 |

*Primary Examiner*—Donald L. Walton
*Attorney, Agent, or Firm*—Robert W. Beart; Glenn W. Bowen

[57] ABSTRACT

A liquid level indicator made of a transparent rod with an upper viewing surface and a lower reflective surface and a battery cap that surrounds the upper portion of the rod is disclosed. The upper portion of the rod carries a large diameter rim having a gas passageway formed thereon and a small diameter rim with a baffle plate disposed above the gas passageway. The cap has a circular opening that surrounds the top of the rod and a lower circular channel which allows for the venting of battery gas upwardly through the circular opening. A porous filter constructed of a material having a low heat conductivity, such as polyvinyl flouride, is retained in place in the opening by a pair of resilient beads on the cap.

6 Claims, 2 Drawing Figures

LIQUID INDICATOR FOR A STORAGE BATTERY WITH A FLAME BARRIER VENT FILTER

BACKGROUND OF THE INVENTION

Hydrogen and oxygen gas formed in storage batteries can build up a pressure sufficient to force off the fill caps of the battery, thereby causing a potentially dangerous explosive condition. In order to overcome this problem, battery caps have been provided with small openings to vent the battery gases to the atmosphere. However, the direct venting of a battery cap still creates a potentially dangerous condition because it is possible to ignite the vented gases and thereby cause an explosion in the battery. In order to overcome this, battery vent plugs for battery caps have been utilized which have a porous structure that allows gas to pass through to the outside of the battery, but which forms a flame barrier that prevents the flame from entering the battery while the battery cap is intact on the battery.

Battery vent plugs for battery caps not comprising indicator members have been formed utilizing sintered silicon carbide. While silicon carbide provides a flame barrier structure, it is a very hard material which fractures easily; and the hardness of the silicon carbide causes a large number of manufacturing problems. In addition, silicon carbide is a very good conductor of heat and if a flame is ignited, heat conducted from the filter to the battery cap, which is generally formed of plastic, melts the cap in a very short time.

It is, therefore, the object of the present invention to provide a porous flame barrier filter for a battery cap and a liquid level indicator assembly in which the filter is formed of a material that has a relatively low heat conductivity.

It is another object of the present invention to provide a porous flame barrier filter for a battery cap and a liquid level indicator assembly in which the porous filter surrounds the transparent rod that forms the liquid level indicator and is held into place by the natural resiliency of the cap when it is inserted over the rod.

It is an additional object of the present invention to provide a typical liquid level indicator and battery cap assembly with a porous flame barrier filter which is secured in the cap around the indicator rod and a pair of rims cooperate with the cap to provide a seal wherein one of the sealing ribs has a gas passageway that allows gas to pass therethrough and the other sealing rim has an outwardly projecting baffle which overlies the gas passageway that tends to prevent the escape of liquid through the porous barrier filter.

Other objects and advantages of the present invention will be apparent from the accompanying description and the drawings.

DESCRIPTION OF THE DRAWINGS

The invention is illustrated in the following drawings in which.

TECHNICAL DESCRIPTION OF THE INVENTION

Figure 1:
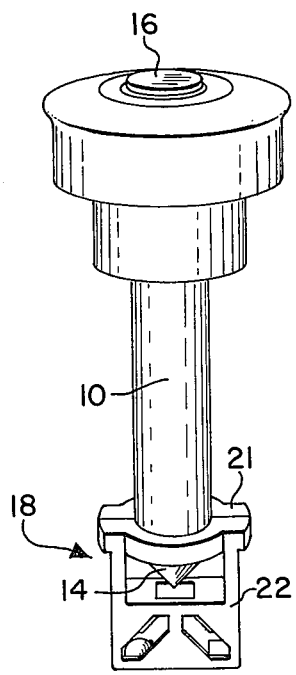
FIG. 1 is a perspective view of a combined liquid level indicator and hydrometer and battery cap assembly that has a filter constructed in accordance with the present invention.

Referring to the drawings there is shown an embodiment of the present invention which is particularly adapted for use with storage batteries. The indicator consists of an elongated transparent rod 10 which may be formed of a transparent platic material such as styrene acrylonitrile, which receives incident light rays 12 which are transmitted down the rod to a lower reflecting surface 14, which in the present embodiment takes the form of a conical surface having an included angle of 90°. The light rays 12 are reflected from one portion of the surface horizontally across to an opposite portion of the surface and then returned upwardly to the viewing surface 16 at the top of the rod 10, when the rod 10 is not immersed in a liquid. When the rod is immersed in a liquid, reflection is thereby prevented. Thus, if a bright pattern is viewed at the viewing surface 16, it indicates that the level of the container being monitored is low.

The rod indicator 10 may be combined with a hydrometer in a manner shown in Ryder U.S. Pat. No. 3,597,973. The hydrometer cage 18 is secured to the lower end of the rod 10 so that the reflecting surface 14 projects into the opening 20 in the hydrometer cage 18. The hydrometer cage 18 may be formed in two housing sections 21,22 which are ultrasonically welded together by means of the male projections 24,26 on the cage section 22, which extend into corresponding female apertures in the other cage section 21. Correspondingly, the apertures 28,30 receive male holding pins from the cage section 22. The hydrometer cage 18 is preferably formed of a plastic material such as styrene acrylonitrile having a filler material which gives it a black color so that it is not transparent. The lower end of the rod 10 is formed with a rib 32 which fits into a corresponding recess 34 in the housing section 21,22. A small ball of an appropriate specific gravity may be formed of a material such as silicone rubber, which is preferably colored a bright color such as green or orange and is retained by the cage 18. The ball 36 is restrained by the sections 21,22 to travel along two paths defined generally by the apertures 38,40 on both sides of the projections 42. When the ball is in the position shown in FIG. 2 the specific gravity will be of a low value. If the liquid level is at the proper height, a dark viewing pattern will be seen at the viewing surface 16. When the ball goes to the dotted position 44 shown below the tip 46 of the conical surface 14, a dark pattern will no longer be seen at the viewing surface 16 since the ball will not be invisible to the viewer. This indicates that the liquid level and the specific gravity are both satisfactory.

Figure 2:
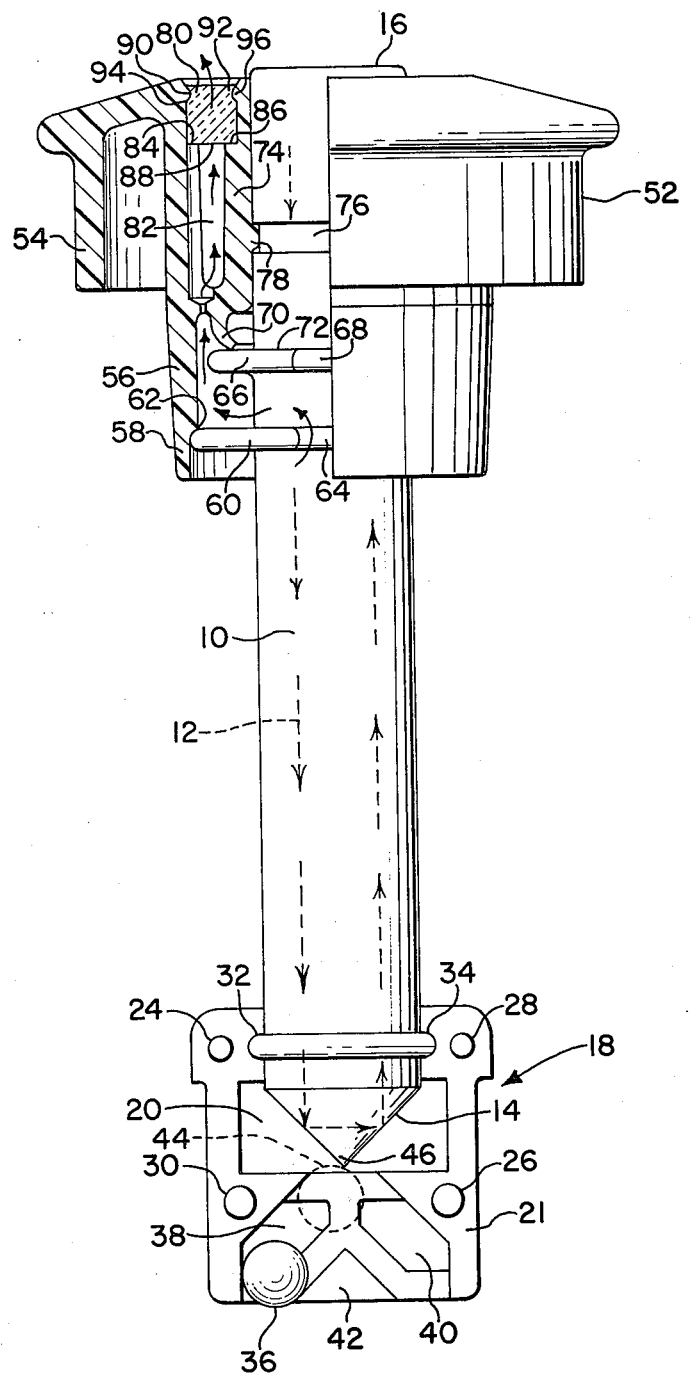
FIG. 2 is a partial cross-sectional showing of the interior of the cap structure of FIG. 1, and the external portion of the rod that is surrounded by the cap and the hydrometer cage with one of the two sections that make up the cage being removed.

The battery cap 52 of FIGS. 1 and 2 is formed of a general typical construction and has an outer portion 54 and an inner portion 56 which has a lower section of a slightly reduced thickness 58. The indicator rod 10 is surrounded by a relatively large diameter rim 60, which may be integrally formed on the rod that engages the shoulder 62 of the inner portion 56 so as to support the cap and to form a seal between the inner periphery of the inner portion 56 and the rim 60.

To allow for the upward passage of gas past the rim 60, a gas passageway 64 is provided in the rim. Disposed above the rim 60 is a second rim 66 of a smaller diameter, which again may be integrally formed with the rod 10 or separately secured thereto, that has an outwardly projecting baffle 68 which is disposed over the gas passageway 64 in the rim 66. The cap 52 has a resilient downwardly projecting lip 70 which is deflected inwardly when the cap is inserted on the rod 10 so that it forms a seal against the upper surface 72 of the rim 66. Located above the lip 70 is a groove 76 which is formed in the rod just below the viewing surface 16 The inner wall 74 of the cap 52 has a projecting rib 78 which fits into the groove 76 so as to lock the battery cap 52 in place on the rod 10.

The porous flame barrier filter 80 is secured into place in the assembly by pressing it down into the upper part of the elongated aperture 82 to the point where the shoulders 84,86 cause a narrowing of the width of the aperture 82 so that the shoulders 84, 86 receive the bottom surface 88 of the filter 80. The cap has a pair of ribs 94,96 integral with the cap 52 which project into the resilient filter 80 in order to secure it firmly in place in the cap 52. In this manner, the natural resiliency of the filter 80 takes effect so that the ribs 94,96 are pressed tightly into the filter 80 when the cap 52 is forced downward in the opening 82 to the position shown in FIG. 2.

The porous flame barrier filter 80 is preferably formed of a material that has a low heat conductivity. Then if a flame is ignited outside of the battery over the filter 80, conduction of heat to the cap 52 will be retarded in the hope that the flame can be put out before the cap is destroyed. The filter 80 is preferably formed of polyvinyl fluoride with a porosity in the range of 200 microns or less.

The invention is claimed as follows:

1. A liquid level indicator having an elongated rod of light transmitting material having an upper viewing surface and a lower reflecting surface, a cap having a through bore adapted to accept the upper end of said rod, an annular chamber in said cap which is spaced from and surrounds the bore and the rod, said chamber being open at its upper end to ambient conditions and at its lower closed end being provided with at least one port which is in communication with the interior of the container being monitored, a porous flame barrier filter positioned within and closing the upper open end of said chamber, said rod further having a relatively large diameter laterally extending rim around said rod and in engagement with the peripheral inner cap wall forming the lower portion of the bore of said cap and having at least one point of discontinuity at the juncture of said rim and said wall, and a relatively small diameter rim around said rod which is positioned above said large diameter rim and spaced from said wall, a resilient sealing lip positioned within said bore of said cap and adapted to engage said smaller diameter rim to seal the bore within which said rod is positioned, said large diameter rim and said wall at their point of discontinuity creating a port means forming a gas passageway to thereby permit the passage of gas upwardly therethrough while said small diameter rim forms a projecting baffle in alignment with said gas passageway, said cap being formed of a resilient material such that when said cap is axially telescoped with the upper end of said rod, the natural resiliency of said cap forms a compression fit with said filter and said rod so as to maintain said rod and filter in place in said cap.

2. A liquid level indicator as claimed in claim 1 wherein said rod includes means for locking said rod relative to the inner bore of said cap in a direction opposite to the lock formed by said sealing lip.

3. A liquid level indicator as claimed in claim 1 wherein said chamber at its open end is provided with protuberance means adjacent its open end and shoulder means axially spaced therefrom to permit initial location of said porous flame barrier filter.

4. A liquid level indicator as claimed in claim 3 wherein said chamber is substantially greater in axial extent than said porous flame barrier filter thereby permitting resilient movement of its inner wall, adjacent the bore of said cap, to permit assembly with the locking means on said rod.

5. A liquid level indicator of the type claimed in claim 4 wherein said locking means includes an annular groove in said rod and an annular rib extending into the bore of said cap and adapted to be accepted complimentarily within said groove of the rod.

6. A liquid level indicator of the type claimed in claim 5 wherein the lower reflecting surface of said rod is positioned within and carries a hydrometer cage including at least one ball having a predetermined specific gravity which is visible through said rod under predetermined conditions.

* * * * *